(12) United States Patent
Carpenter et al.

(10) Patent No.: US 11,356,024 B2
(45) Date of Patent: Jun. 7, 2022

(54) IGNITION EXCITER ASSEMBLY AND METHOD FOR CHARGING A TANK CAPACITOR FOR AN IGNITION EXCITER

(71) Applicant: Unison Industries, LLC, Jacksonville, FL (US)

(72) Inventors: Jay Joseph Carpenter, St. Augustine, FL (US); Michael Joseph Cochran, Jacksonville, FL (US); Robert Wake Cook, Saint Johns, FL (US)

(73) Assignee: Unison Industries, LLC, Jacksonville, FL (US)

( * ) Notice: Subject to any disclaimer, the term of this patent is extended or adjusted under 35 U.S.C. 154(b) by 150 days.

(21) Appl. No.: 16/212,081

(22) Filed: Dec. 6, 2018

(65) Prior Publication Data

US 2020/0186040 A1 Jun. 11, 2020

(51) Int. Cl.
| | |
|---|---|
| *H02M 3/335* | (2006.01) |
| *H02M 1/44* | (2007.01) |
| *F02P 7/077* | (2006.01) |
| *H02M 1/08* | (2006.01) |
| *H02M 7/04* | (2006.01) |
| H02M 3/158 | (2006.01) |
| H02M 1/12 | (2006.01) |

(52) U.S. Cl.
CPC ............ *H02M 3/335* (2013.01); *F02P 7/077* (2013.01); *H02M 1/08* (2013.01); *H02M 1/44* (2013.01); *H02M 7/04* (2013.01); H02M 1/126 (2013.01); H02M 3/158 (2013.01)

(58) Field of Classification Search
CPC .......... H02M 3/335; H02M 1/44; H02M 1/08; H02M 7/04; H02M 3/158; H02M 1/126; F02P 7/077; H02J 7/0052

USPC .................................................... 361/23, 247
See application file for complete search history.

(56) References Cited

U.S. PATENT DOCUMENTS

| | | | | |
|---|---|---|---|---|
| 4,958,109 | A | * 9/1990 | Naum | ................... H05B 41/042 315/220 |
| 5,446,348 | A | 8/1995 | Michalek et al. | |
| 5,561,350 | A | 10/1996 | Frus et al. | |
| 5,656,966 | A | 8/1997 | Wilmot et al. | |
| 6,297,568 | B1 | 10/2001 | Kempinski | |
| 6,944,034 | B1 | * 9/2005 | Shteynberg | ....... H02M 3/33523 363/21.13 |
| 7,095,181 | B2 | 8/2006 | Frus et al. | |
| 8,266,885 | B2 | 9/2012 | Wright | |
| 8,305,049 | B2 | 11/2012 | Maddali et al. | |
| 9,267,438 | B2 | 2/2016 | Dooley et al. | |
| 9,593,660 | B2 | 3/2017 | Wright | |
| 2002/0033679 | A1 | * 3/2002 | Hui | ......................... H05B 41/28 315/307 |
| 2010/0073844 | A1 | * 3/2010 | Osa | ......................... G06K 9/46 361/263 |
| 2016/0298590 | A1 | * 10/2016 | Garrard | ............. H02M 3/33523 |
| 2018/0102709 | A1 | * 4/2018 | Hari | ................... H02M 3/33523 |
| 2018/0339356 | A1 | * 11/2018 | Mnich | ................... B23K 9/0677 |

* cited by examiner

*Primary Examiner* — Danny Nguyen
(74) *Attorney, Agent, or Firm* — McGarry Bair PC

(57) ABSTRACT

An ignition exciter high frequency switching converter, ignition assembly, and method of operating the same, include a high frequency switching converter operably by way of a control circuit having a timing mechanism, to operate the high frequency switching converter in discontinuous conduction mode to charge a tank capacitor for igniting an igniter.

17 Claims, 4 Drawing Sheets

IGNITION EXCITER ASSEMBLY AND METHOD FOR CHARGING A TANK CAPACITOR FOR AN IGNITION EXCITER

BACKGROUND

In ignition systems, a power source device is often electrically coupled to an igniter by way of a charging circuit. The charging circuit can operate to charge an ignition capacitor, storing energy that is ultimately discharged by way of a spark at the igniter. In an example of an engine, the spark from the igniter, in turn, ignites a combustible fuel.

BRIEF DESCRIPTION

In one aspect, the present disclosure relates to a high frequency switching converter for charging a capacitor, including a flyback transformer receiving a power supply at a transformer input, and a transformer output, a flyback diode disposed at the transformer output, a switching transistor disposed in series with the transformer input, and a control circuit configured to operate the switching transistor such that the flyback transformer operates in discontinuous conduction mode (DCM).

In another aspect, the present disclosure relates to an ignition system, including a power source, a high frequency switching converter including a flyback transformer receiving a power supply from the power source at a transformer input, and a transformer output, a flyback diode disposed at the transformer output, and a switching transistor disposed in series with the transformer input, a control circuit configured to operate the switching transistor such that the flyback transformer operates in discontinuous conduction mode (DCM), and an ignition exciter output stage having a tank capacitor and an igniter, wherein the transformer output is connected across the tank capacitor and operates to charge the tank capacitor, and wherein the igniter operably discharges the tank capacitor.

DETAILED DESCRIPTION

Figure 1:
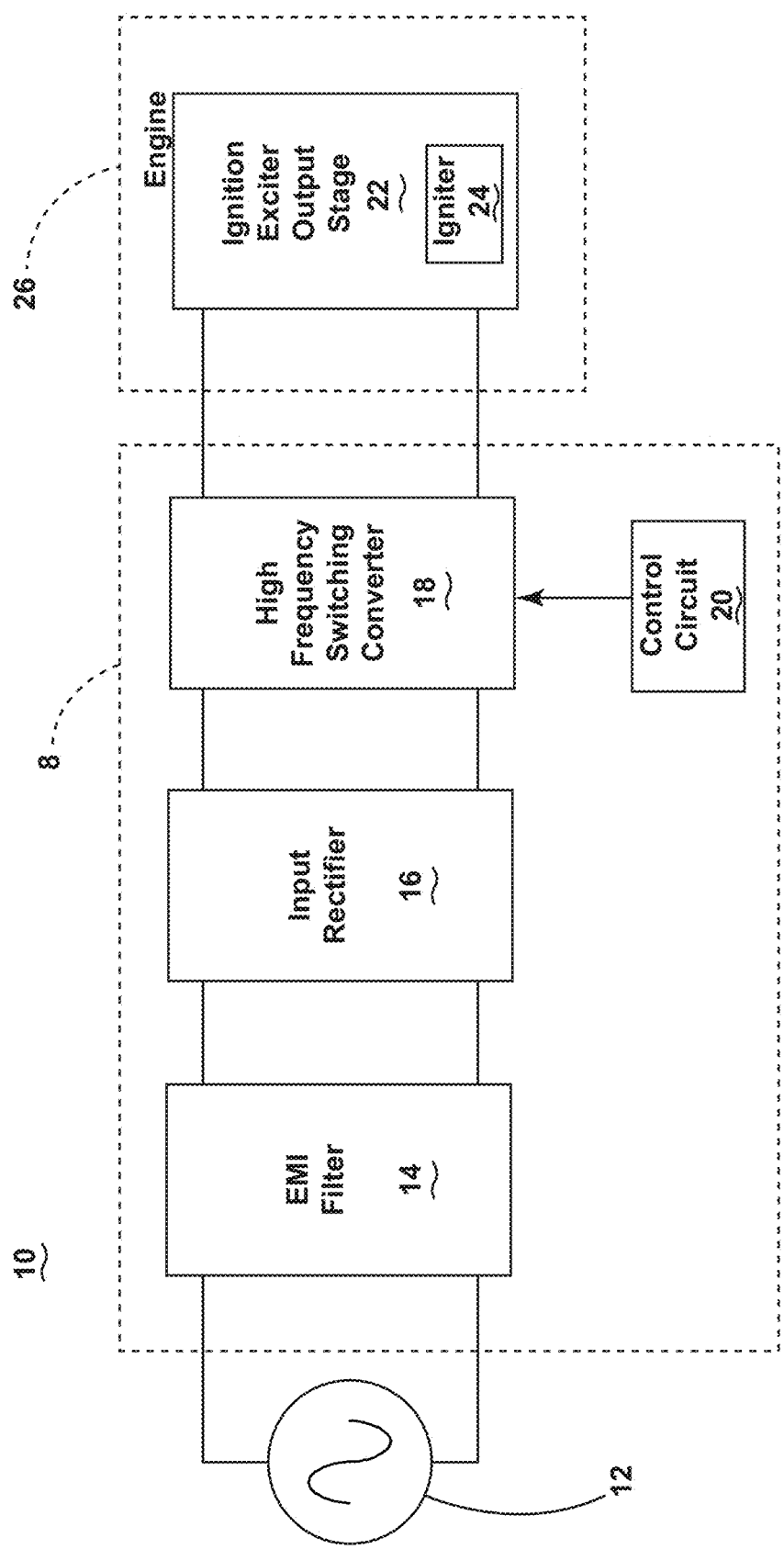
FIG. 1 is a schematic view of an ignition exciter charging circuit for an engine, in accordance with various aspects described herein.

Aspects of the disclosure described herein are directed to an ignition exciter assembly and a method for charging a tank capacitor for an ignition exciter. The assembly can include, for example, a circuit system having a power source supplying power to a charging converter, such as a high frequency switching converter, and a chargeable element, such as a tank capacitor. For purposes of illustration, the present disclosure is described with respect to an igniter system for a turbine engine. It should be understood, however, that aspects of the disclosure described herein are not so limited and may have general applicability within any engine or suitable electrical system utilizing an ignition exciter.

While "a set of" various elements will be described, it will be understood that "a set" can include any number of the respective elements, including only one element. Also as used herein, while sensors can be described as "sensing" or "measuring" a respective value, sensing or measuring can include determining a value indicative of or related to the respective value, rather than directly sensing or measuring the value itself. The sensed or measured values can further be provided to additional components. For instance, the value can be provided to a controller module or processor, and the controller module or processor can perform processing on the value to determine a representative value or an electrical characteristic representative of said value.

Additionally, while terms such as "voltage", "current", and "power" can be used herein, it will be evident to one skilled in the art that these terms can be interrelated when describing aspects of the electrical circuit, or circuit operations.

All directional references (e.g., radial, axial, upper, lower, upward, upstream downward, downstream, left, right, lateral, front, back, top, bottom, above, below, vertical, horizontal, clockwise, counterclockwise) are only used for identification purposes to aid the reader's understanding of the disclosure, and do not create limitations, particularly as to the position, orientation, or use thereof. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other. In non-limiting examples, connections or disconnections can be selectively configured to provide, enable, disable, or the like, an electrical connection between respective elements. Non-limiting example power distribution connections or disconnections can be enabled or operated by way of switching, bus tie logic, or any other connectors configured to enable or disable the energizing of downstream devices or components As used herein, a "system" or a "controller module" can include at least one processor and memory. Non-limiting examples of the memory can include Random Access Memory (RAM), Read-Only Memory (ROM), flash memory, or one or more different types of portable electronic memory, such as discs, DVDs, CD-ROMs, etc., or any suitable combination of these types of memory. The processor can be configured to run any suitable programs or executable instructions designed to carry out various methods, functionality, processing tasks, calculations, or the like, to enable or achieve the technical operations or operations described herein. The program can include a computer program product that can include machine-readable media for carrying or having machine-executable instructions or data structures stored thereon. Such machine-readable media can be any available media, which can be accessed by a general purpose or special purpose computer or other machine with a processor. Generally, such a computer program can include routines, programs, objects, components, data structures, algorithms, etc., that have the technical effect of performing particular tasks or implement particular abstract data types.

In another non-limiting example, a control module can include comparing a first value with a second value, and operating or controlling operations of additional components based on the satisfying of that comparison. For example, when a sensed, measured, or provided value is compared with another value, including a stored or predetermined value, the satisfaction of that comparison can result in actions, functions, or operations controllable by the controller module. As used, the term "satisfies" or "satisfaction" of the comparison is used herein to mean that the first value satisfies the second value, such as being equal to or less than the second value, or being within the value range of the second value. It will be understood that such a determination may easily be altered to be satisfied by a positive/negative comparison or a true/false comparison. Example comparisons can include comparing a sensed or measured value to a threshold value or threshold value range.

As used herein, a controllable switching element, or a "switch" is an electrical device that can be controllable to toggle between a first mode of operation, wherein the switch is "closed" intending to transmit current from a switch input to a switch output, and a second mode of operation, wherein the switch is "open" intending to prevent current from transmitting between the switch input and switch output. In non-limiting examples, connections or disconnections, such as connections enabled or disabled by the controllable switching element, can be selectively configured to provide, enable, disable, or the like, an electrical connection between respective elements.

The exemplary drawings are for purposes of illustration only and the dimensions, positions, order and relative sizes reflected in the drawings attached hereto can vary.

Referring now to FIG. 1, an ignition exciter assembly, such as an ignition system 10 or ignition system charging circuit can include an exciter 8, a charging power source 12, shown as an alternating current (AC) power source 12, an electromagnetic interference (EMI) filter 14, and input rectifier 16, a high frequency switching converter 18, and an ignition exciter output stage 22, arranged in series. In one non-limiting example, the EMI filter 14 can be adapted or configured to remove high frequency content from power supplied by the AC power source 12, prevent feedback from current spikes, or a combination thereof. Aspects of the EMI filter 14 and input rectifier 16 are not germane to aspects of the disclosure. As used herein, a high frequency switching converter 18 can include a circuit configured or adapted to provide a charging power output. In one non-limiting example, the high frequency switching converter 18 can be referred to as an "ignition exciter" that provides the charging power output to the ignition exciter output stage 22. The high frequency switching converter 18 can further receive an input from a control circuit 20 adapted to controllably operate the high frequency switching converter 18 to supply charging power to the ignition exciter output stage 22. The ignition exciter output stage 22 can include an igniter 24 for generating or energizing combustion-based ignition in a machine, engine, or the like, shown generically as an engine 26. While an AC power source 12, such as a generator output is illustrated, any power source can be included in aspects of the disclosure. In one non-limiting example, the engine 26 can be a turbine engine, with the igniter 24 housed inside of a combustor or combustion section.

During operation of the ignition system 10, the AC power source 12 supplies electrical energy or power to the high frequency switching converter 18. As shown, the power supplied by the AC power source 12 can be filtered by the EMI filter 14, and rectified to direct current (DC) power by the input rectifier 16, prior to being delivered to the high frequency switching converter 18. The high frequency switching converter 18 is enabled or operable to convert the received first DC power to another second DC power having different electrical energy characteristics compared with the received DC power from the input rectifier 16. In one non-limiting example, the converted second DC power can have a higher voltage compared to the first DC power. The high frequency switching converter 18 can further be controllable by way of the control circuit 20, such that the converting or conversion of the first DC power to the second DC power occurs or is modified, adjusted, or otherwise performed in response to input received from the control circuit 20.

The converted second DC power is delivered to the ignition exciter output stage 22, wherein a chargeable component is charged with the converted second DC power until the ignition exciter output stage 22 is prepared to operate the igniter 24 to ignite combustion or fuel in the engine 26. In one non-limiting example, the chargeable component can include a capacitor, such as a tank capacitor (not shown) adapted or selected for storing energy at high voltages, on the order of several kilovolts DC. The ignition exciter output stage 22 then delivers the DC power stored in the chargeable component to the igniter 24, creating a spark that ignites a combustible fuel in the engine 26, or for otherwise operating a downstream system via ignition. The aforementioned operation can repeat discretely or continuously, as needed, so as to sustain combustion operation of the engine 26.

A system power factor for the ignition system 10 can include the product of two aspects or considerations: the displacement power factor (DPF) and the distortion factor (DF). The DPF is a measurement of the phase relationship between the voltage supply, such as the AC power source 12, and the fundamental component of current of the AC power source 12, while the DF is a percentage of fundamental current of the power source 12 to the entire root mean square (RMS) current content of the AC power supply waveform. For a high power factor (e.g. efficient operation of the ignition system 10), both DPF and DF should be highly correlated, or aligned (e.g. a "unity power factor"). In one example, the correlation between DPF and DF, in accordance with aspects of the disclosure can achieve a power factor greater than 0.8.

The simplest type of exemplary electrical system which exhibits unity power factor is an AC voltage source connected to a purely resistive load. In this example system, the current drawn from the power source and supplied to the load is perfectly in-phase with the system voltage, yielding unity displacement power factor (e.g. substantially a one-to-one relationship or ratio). Also, since the electrical load (the resistor) is passive and does not generate harmonics, the system distortion factor is in unity. As a result, system power factor is unity and the apparent power equals the real power, representing the theoretical limit of real power transfer capability of any given electrical system.

A typical or conventional high frequency switching converter or ignition exciter can have a poor power factor because the input characteristics of the high frequency switching converter vastly differ from the purely resistive load described above. Exactly how the exciter input characteristics differ from the ideal case depends upon the exciter topology. AC input exciters which utilize magnetic components that operate at the line frequency tend to degrade the DPF due to the presence of input current limiting inductors, while the AC input exciters which utilize magnetic components that operate at high frequencies tend to degrade the system DF since the diodes of the input rectifier conduct narrow current pulses during the moments when the line voltage exceeds the rectified DC bus voltage.

Regardless of how each conventional exciter topology degrades power factor, they both have one thing in common: more input current from the power source is required to be drawn to support a given exciter output charging power. Furthermore, since resistive power losses are directly proportional to the square of current, overall system efficiency suffers. The power losses in the components which must support the current cause heat generation within the unit due to resistive heating. That heating can further affect the efficiency of the exciter magnetic components, which can be affected by temperature changes. To keep the exciter magnetic components within acceptable temperature limits, larger diameter wires must be utilized in conventional exciters to keep the resistive heating losses down. As a result, the unit becomes costlier and heavier. Additionally, the AC source supplying power to the exciter must support the extra current draw from the exciter, imposing the same negative consequences on the power source equipment.

Figure 2:
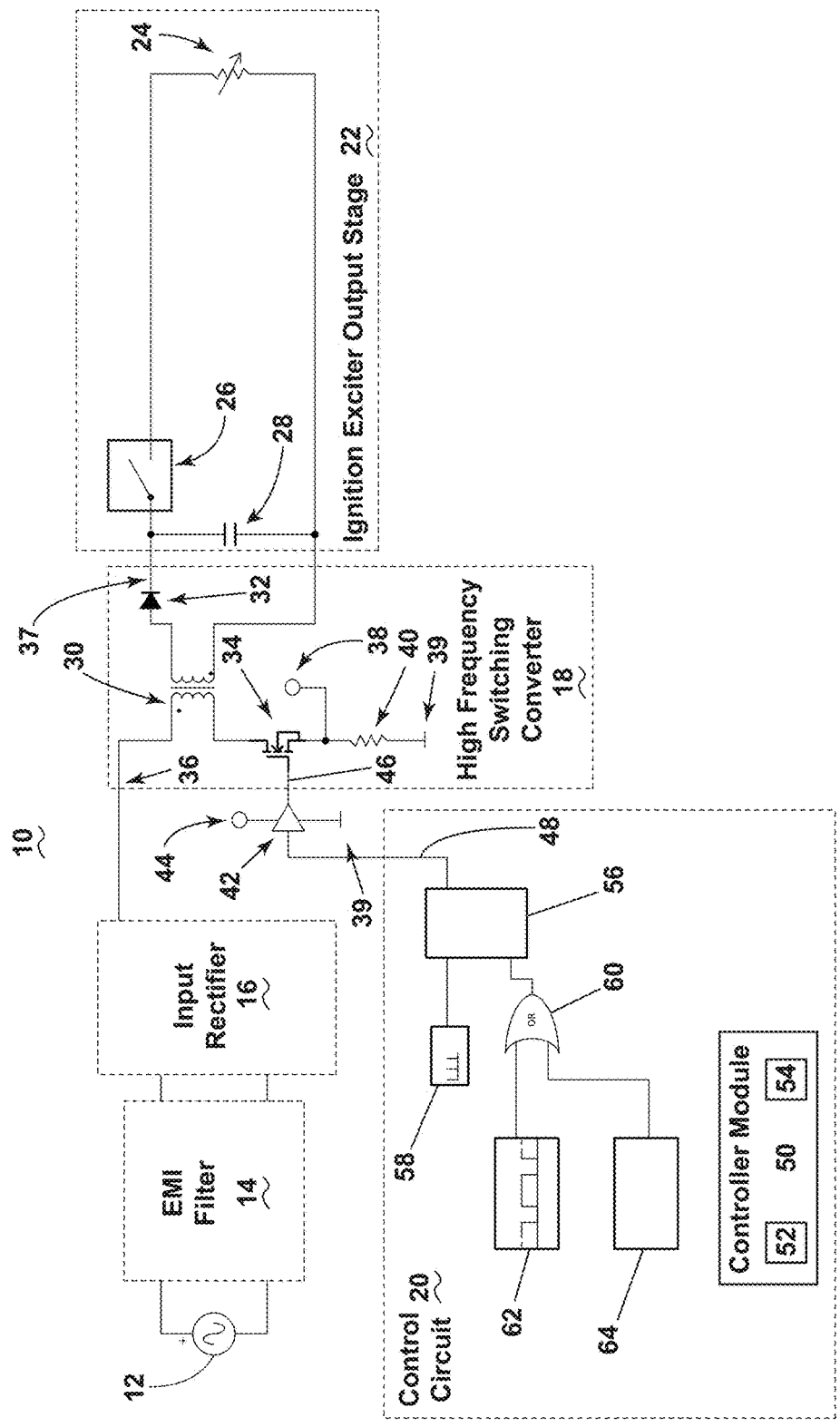
FIG. 2 is a schematic view of the ignition exciter charging circuit assembly of FIG. 1 illustrating additional details of a high frequency switching converter, in accordance with various aspects described herein.

FIG. 2 illustrates additional details of the ignition system 10 of FIG. 1. As shown, the ignition exciter output stage 22 can include the igniter 24, shown as a schematic electrical load. The ignition exciter output stage 22 can further include a tank capacitor 28 for storing the electrical energy to ignite the igniter 24, and a switchable element 26 for controllably discharging the tank capacitor 28 to ignite the igniter 24.

The high frequency switching converter 18 is shown further including a magnetically coupled inductor (or flyback transformer 30) for storing and transferring energy from a converter input 36 to a converter output 37 via high voltage flyback diode 32, respectively, on a switching cycle by cycle basis. In this sense, the energy transferred to the converter output 37 is used to charge the tank capacitor 28 to a DC voltage, which is then discharged during operation of the igniter 24 once switchable element 26 is closed.

The primary windings of the flyback transformer 30 are further connected to a DC return ground 39 by way of a high frequency switching transistor 34 and a sense resistor 40 arranged in series. As used herein, a "high frequency switching transistor" can include a transistor that operates at a switching speed at least twenty times faster than the frequency of the AC power source 12. Also as used herein, a DC return ground 39 is an electrical low voltage node, and can include, for example, an electrical Earth ground, or another ground relative to the DC voltage received at the converter input 36. Also as shown, the primary winding current can be sensed at measuring or voltage node 38, using a current sense resistor 40 positioned in line with the transistor 34. In one non-limiting example, the current measuring node 38 can be adapted or configured to sense or measure the current along the high frequency switching transistor 34 or sense resistor 40.

The high frequency switching transistor 34 can be controlled by way of a gate drive input 46 signal received from a gate driver 42. The gate driver 42 can controllably operate the transistor to conduct current in response to receiving a driver signal 48 from the control circuit 20, enabling either a high logic signal (supplied by a schematic high logic voltage source 44; enabling current conduction by the high frequency switching transistor 34) or a low logic signal (supplied by the DC return ground 39; disabling current conduction by the high frequency switching transistor 34).

The control circuit 20 can further include a timing mechanism for generating the driver signal 48 provided to the gate driver 42. For instance, in one non-limiting time mechanism example, the control circuit 20 can include a latch 56 receiving a clock signal from a pulse width modulation (PWM) clock 58 at a "set" input. In one non-limiting example, the PWM clock signal is faster than the AC frequency of the AC power source 12. The latch 56 can further receive an input from an OR gate 60 further connected with a clock 62 defining an on/off clock signal and a safety control mechanism 64 which monitors voltage at node 38 via current flow in current sense resistor 40. In one example, the clock 62 can define a repeating on/off cycle with a constant ON time and constant OFF time, typically in the microsecond range. The safety control mechanism 64 can be adapted to generate a high logic signal during a transient state upon receiving a signal from current sense resistor 40 through measurement of node 38 following the discharge of the tank capacitor 28.

Thus, aspects of the timing mechanism can ensure that the PWM clock 58 enables the high frequency switching transistor 34 to conduct current (via the driver signal 48) until latch 56 receives a reset signal originating from clock 62 or safety control mechanism 64 following the recent discharge of tank capacitor 28, wherein the high frequency switching transistor 34 prevents current conduction upon latch 56 receiving a reset signal. Furthermore, the control circuit 20 enables or allows for the controllable operation of the high frequency switching transistor 34 (by way of the driver signal 48) faster than the frequency of the AC power source 12. In one non-limiting example, the controllable operation of the high frequency switching transistor 34 can be cycled by way of the control circuit 20 at least twenty times faster than the frequency of the AC power source 12. In one non-limiting example the safety mechanism 64 can be enabled to prevent excessive pulse currents to be drawn from the input 36 following discharge of the tank capacitor 28 (or too soon thereafter), to prevent unintentional electrical operations or results.

While a specific circuit of the control circuit 20 enabling the timing mechanism is illustrated, non-limiting aspects of the disclosure can further be included wherein the timing mechanism is controllable by way of a controller module 50 having a processor 52 and memory 54, wherein the driver signal 48 is generated based on an executable instruction set, such as software.

Aspects of the disclosure can enable or provide for active power factor correction applied to the charge converter 18 by forcing the converter input 36 to appear resistive in nature by way of controllably operating the high frequency switching transistor 34 connected with primary windings of the flyback transformer 30 during the charging of the tank capacitor 28. By further utilizing the high voltage flyback diode 32, the high frequency switching converter 18 operates in a discontinuous conduction mode (DCM) at constant frequency and constant duty cycle to force the peak current received at the converter input 36 (and for example, measured by the current sense resistor 40) to accurately align with, correspond to, or otherwise track the AC line voltage from the AC power source 12 and achieve high power factor during the charging of the tank capacitor 28.

Thus, aspects of the disclosure are included wherein the high frequency switching converter 18 operates as a switching or switchable DCM flyback converter used to provide near unity displacement power factor while constant power charging the tank capacitor 28. Furthermore, based on the timing mechanisms of the control circuit 20 to operate the switching transistor 34 (and thus controlling the high frequency switching converter 18 operations), the high frequency switching converter 18 free runs at a constant frequency and duty cycle (as controlled by the control circuit 20) but with a peak current limit imposed on the power device for high frequency switching converter 18 safety during any transients or output shorts.

With a flyback-type transformer 30, the primary winding conducts current first using the high frequency switching transistor 34 (effectively storing a tiny amount of magnetic energy in the transformer core). The high frequency switching transistor 34 then turns off, and the secondary winding then conducts (energy stored in the core is then released to the output 37). As the secondary winding conducts through the high voltage flyback diode 32, it dumps the current that was stored in the primary windings to the output 37. This type of cycle of current conduction between primary and secondary windings is unique in a flyback transformer 30. It takes many of these cycles to build up enough charge on the output tank capacitor 28 before being discharged into the igniter 24 because the magnetic energy stored in the core every switching cycle is relatively small compared to what is ultimately stored and collected in the output tank capacitor 28.

While the gate driver 42 is shown apart from the high frequency switching converter 18 and the control circuit 20, non-limiting aspects of the disclosure can be included wherein the aspects of the gate driver 42 can be included in the high frequency switching converter 18, the control circuit 20, another component, or a combination thereof.

Figure 3:
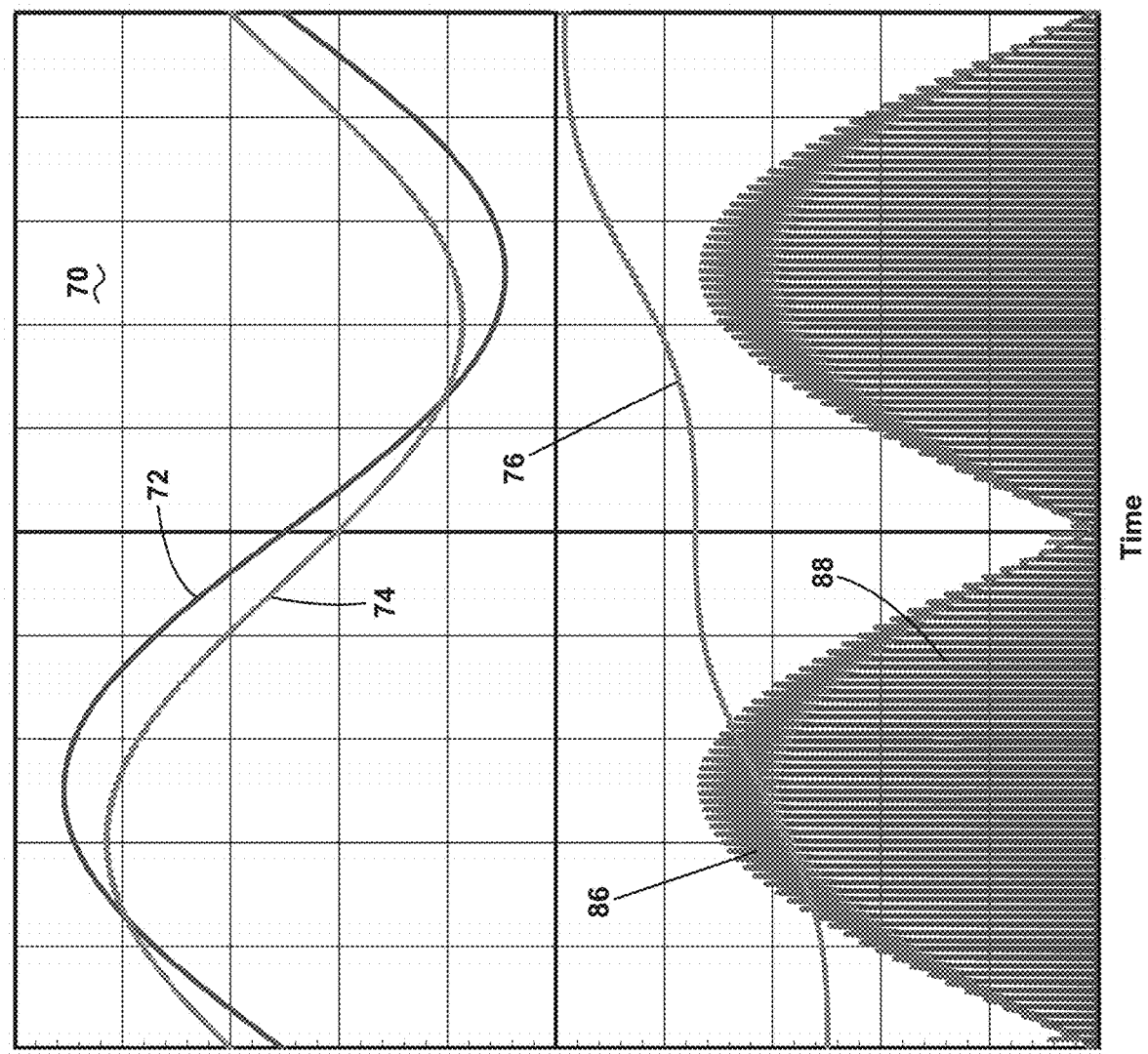
FIG. 3 is a series of plot graphs showing charging operations of the ignition exciter charging circuit assembly of FIG. 2, in accordance with various aspects described herein.

FIG. 3 illustrates a set of example plot graphs 70 showing charging operations of the ignition system 10. Line 72 represents an example AC voltage signal provided by the AC power source 12. Line 74 represents a corresponding AC input current delivered to the input filter 14 from the AC power source 12, in accordance with aspects of the disclosure. Line 86 illustrates the converter input voltage received at the converter input 36. Line 88 represents the current across the sense resistor 40.

As shown, the AC input current 74 is switchably controlled during pulses, as conducted by way of the high frequency switching transistor 34 and control circuit 20, resulting in the current across the sense resistor 88. As shown, by operating the switching of high frequency switching transistor 34 (by way of the control circuit 20), the high frequency switching converter 18 runs at a constant frequency and duty cycle, and operating as a DCM flyback converter wherein current received by the flyback-type transformer 30 (and shown by way of the current across the sense resistor 88) aligns with, corresponds to, or otherwise tracks the rectified input voltage (converter input voltage received at converter input 36) accurately, achieving a high power factor during the charging of the tank capacitor 28. The high power factor is achieved in both the negative voltage portion of the voltage signal 72 (which is rectified by the input rectifier 16) as well as the positive voltage portion of the voltage signal. The plot graphs 70 further illustrate a representative voltage charge 76 of the tank capacitor 28.

Aspects of the plot graph 70 of FIG. 3 are exemplary drawings for purposes of illustration and understanding only. The scale, relative plots, order and relative sizes reflected in the schematic plot graph 70 are not intended to convey specific limitations to aspects of the disclosure.

Figure 4:
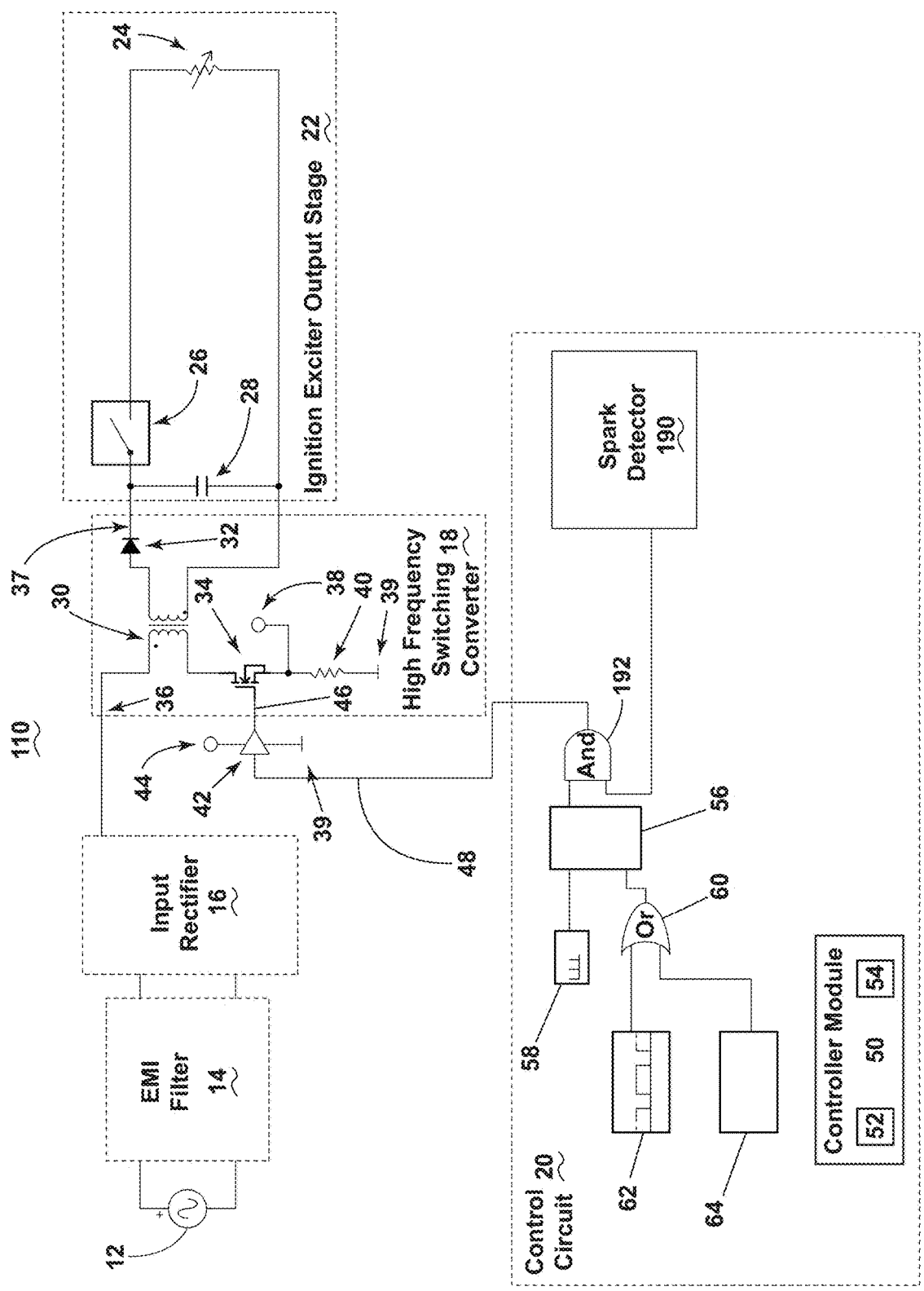
FIG. 4 is a schematic view of another ignition exciter charging circuit assembly of FIG. 1 illustrating additional details of another control circuit, in accordance with various aspects described herein.

FIG. 4 illustrates another ignition system 110 according to another aspect of the present disclosure. The ignition system 110 is similar to the ignition system 10; therefore, like parts will be identified with like numerals increased by 100, with it being understood that the description of the like parts of the ignition system 10 applies to the ignition system 110, unless otherwise noted. One difference is that the control circuit 20 of the ignition system 110 can include further timing mechanisms or timing mechanism enhancements, compared with the ignition system 10. For example, as shown, a discharge detector 190 is shown that is configured or capable of detecting the spark of the igniter 24 during ignition system 110 operations. In one non-limiting example, the discharge detector 190 can include a light sensitive sensor, such as an optocoupler to conduct a short pulse of current right after the controllable switch 26 turns ON to discharge the tank capacitor 28. The output of the spark detector 190 can be provided to an AND logic gate 192, which further receives an input from the previously described latch 56. In this sense, the high frequency switching converter 18 can further be operable based on not only the timing mechanism of the control circuit 20, but also the spark cycle of the igniter 24.

Further non-limiting alternative aspects of the disclosure of the timing mechanism can be included wherein, for example, the control circuit 20 can account for input frequency changes or input voltage changes from the AC power source 12, or a combination of frequency and voltage changes, while still controlling the high frequency switching converter 18, as described herein. In yet, another non-limiting alternative aspect of the disclosure of the timing mechanism can be included wherein, for example, the control circuit 20 can further detect and account for demagnetization of the flyback transformer 30, and account for the same during charging operations.

These aspects of the disclosure can account for disadvantages of conventional ignition systems. In conventional ignition systems a spark rate may deviate from nominal conditions considerably with input line voltage fluctuations, since processed power is proportional to the square of the input voltage. Increasing input voltages from these fluctuations could lead to excessively high converter peak currents, which could stress the exciter beyond its thermal limits.

In contrast to the conventional ignition systems, aspects of the disclosure can set the timing mechanism in accordance with the spark rate, for example, as detected by the discharge detector 190. If the input voltage increases considerably and charges the tank capacitor 28 faster than nominal, the ignition system 110 will be adapted to wait with the high frequency switching converter 18 disabled (by way of the AND logic gate 192 of the control circuit 20) until the spark rate clock or timing mechanism initiates the next charge cycle. Thus, aspects of the disclosure sets the maximum spark rate of the igniter 24 and prevents line fluctuations from leading to excessive power processing, internal heating, or a combination thereof.

Thus, aspects of the disclosure are included wherein the ignition exciter or high frequency switching converter 18 with active power factor correction achieves constant power charging of an energy storage ignition capacitor while simultaneously maintaining a high input power factor. Since power factor approaches unity, aspects of the disclosure reduces weight and cost of the high frequency switching converter since the unit will only draw the minimum required input current to operate.

Many other possible aspects and configurations in addition to that shown in the above figures are contemplated by the present disclosure. For example, variations on aspects of the disclosure can be included wherein the latch 56 is set and reset. A first "thing" or control sets the latch 56 to turn it on (controlling the high frequency switching transistor 34), another "thing" or control resets the latch 56 to turn it off so that the high voltage flyback diode 32 will conduct and dump the stored energy to the output 37.

In a first example, the latch 56 set/reset can operate as a current-limit function for the high frequency switching converter 18 safety following tank capacitor discharges. With this approach, the charging power varies with the input voltage, and since there is nothing preventing the tank capacitor 28 from discharging at a fixed rate, the load power (igniter 24 power) varies. In this example, "safety" as described refers to ensuring the high frequency switching converter 18, for example, does not draw excessively high amplitude current pulses following tank capacitor discharges or if the input voltage increases to too high a level. The set and reset signals can be controlled as needed in this first example. In this example, the RESET signal should come from the termination of the ON time signal much of the time. The current limit function should only activate for a short time after the tank capacitor 28 discharges (e.g. while the tank capacitor 28 charges up and the mode goes discontinuous).

In a second example, the charging power varies with the input voltage, however, the overall delivered power to the igniter 24 stays constant. By using a spark rate clock or ignition clock related to the operation of the igniter 24, this example controls how often the tank capacitor 28 is discharged into the igniter 24, regardless of how fast we charge the tank capacitor 28. With a constant discharge rate of the tank capacitor 28, the load power is constant. The set and reset signals can be controlled as needed in this second example.

In a third example, the high frequency switching transistor 34 ON time adjusts in response to line voltage changes. For example, if the line voltage doubles, the high frequency switching transistor 34 on time is cut in half, and charging power stays the same since by cutting the on time in half, we now operate with one-half the duty cycle we had before. Since converter charging power is inversely proportional to the duty cycle squared and also proportional to the RMS line voltage squared, spark rate changes due to line voltage fluctuations are effectively nullified. In this third example, no spark rate clock is needed at all. The high frequency switching converter 18 control circuit 20 automatically adjust the set/reset signals to always charge the tank capacitor 28 at the same rate. In this third example, the latch can be set any way or in accordance with any timing, but the resetting of the latch 56 is taken care of by line voltage sensing circuitry.

In a fourth example, the high frequency switching transistor 34 ON time adjusts in response to line voltage changes similar to the third example, except that the high frequency switching transistor 34 peak current envelope is forced to track a reference voltage derived from the rectified voltage of the input rectifier 16. A multiplier functions to enable or allow the peak current envelope to adjust to line voltage fluctuations so as to maintain a constant output power. This is achieved through the multiplication of a DC voltage which decreases with increasing input voltage and a scaled version of the converter input voltage 36. In this manner, a peak current reference is generated which has an amplitude which decreases with increasing input voltage, but also a shape which follows the rectified line voltage (converter input voltage 36). With this example, the latch 56 can be set in any number of ways, however, the reset action is controlled by the comparison of the peak current reference (multiplier output signal) and the sensed peak transistor current.

Additionally, the design and placement of the various components can be rearranged such that a number of different configurations could be realized.

The aspects disclosed herein provide an ignition exciter or high frequency switching converter 18 with active power factor correction. The technical effect is that the above described aspects enable the efficient charging of the tank capacitor while preventing excessive power processing or internal heating, thus increasing the overall efficiency of the ignition system. One advantage that can be realized in the above aspects is that the above described aspects of the disclosure achieves constant power charging of an energy storage ignition capacitor while simultaneously maintaining a high input power factor in one simple power conversion stage. Another advantage can include operating the high frequency switching converter at a high switching frequency, which results in smaller magnetic components than if they were operated at line frequency (as in conventional systems). Yet another advantage can include that the ignition exciter output stage does not require large DC bus filter capacitors, eliminating reliability, weight, life, cost, and inrush issues associated with those parts.

Yet another advantage can be included, wherein because the high frequency switching converter draws only the current needed to operate and does not have to support additional reactive current, copper losses are dramatically decreased in the ignition system, as compared to other conventional approaches. Furthermore, in the aspects described herein, the line frequency transformer can be eliminated altogether, while still accounting for variations in line frequency. The elimination of the line frequency transformer can reduce weight, cost, and copper loss issues associated with this part.

To the extent not already described, the different features and structures of the various aspects of the disclosure can be used in combination with each other as desired. That one feature cannot be illustrated in all of the aspects of the disclosure is not meant to be construed that it cannot be, but is done for brevity of description. Thus, the various features of the different aspects of the disclosure can be mixed and matched as desired to form new aspects of the disclosure, whether or not the new aspects of the disclosure are expressly described. Combinations or permutations of features described herein are covered by this disclosure.

This written description uses examples to disclose aspects of the disclosure, including the best mode, and also to enable any person skilled in the art to practice aspects of the disclosure, including making and using any devices or systems and performing any incorporated methods. The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A high frequency switching converter operating in an open loop for charging a capacitor, comprising:
   a flyback transformer receiving a rectified alternating current power supply at a transformer input, and a transformer output;
   a flyback diode disposed at the transformer output;
   a switching transistor disposed in series with the transformer input; and a control circuit configured to operate the switching transistor such that the flyback transformer operates in discontinuous conduction mode (DCM), the control circuit further comprising:
 a clock configured to generate a clock signal faster than the frequency of the alternating current power supply; and
 a safety control mechanism configured to monitor a voltage at the switching transistor;
 wherein the control circuit is configured to operate the switching transistor by way of a SET and RESET latch cycle, and wherein the clock signal is received at a SET input of a latch, and wherein the safety control mechanism is connected with a RESET input of the latch.

2. The high frequency switching converter of claim 1 wherein the control circuit is further configured to operate the switching transistor such that the flyback transformer operates in DCM at a constant frequency.

3. The high frequency switching converter of claim 1 wherein the control circuit is further configured to operate the switching transistor such that the flyback transformer operates in DCM at a constant duty cycle.

4. The high frequency switching converter of claim 1 wherein the capacitor is a tank capacitor and the transformer output is connected with the tank capacitor.

5. The high frequency switching converter of claim 4 wherein the transformer output is connected with an ignition exciter having an igniter, and the tank capacitor stores energy for energizing the igniter.

6. The high frequency switching converter of claim 5 wherein the control circuit further operates the switching transistor based on an igniter cycle of the ignition exciter.

7. The high frequency switching converter of claim 1 wherein the operating the switching transistor enables the receiving of current at the transformer input to correlate with a current of the alternating current power supply.

8. The high frequency switching converter of claim 7 wherein the correlation achieves a power factor greater than 0.8.

9. The high frequency switching converter of claim 1 wherein the operating the switching transistor enables a constant power charging at the transformer output.

10. The high frequency switching converter of claim 1 wherein the control circuit is configured to operate the switching transistor by way of ensuring the charging power stays constant in response to line voltage changes.

11. An ignition system, comprising:
 an alternating current power source;
 a high frequency switching converter operating in an open loop, wherein the high frequency switching converter includes:
  a flyback transformer receiving a power supply from the alternating current power source at a transformer input, and a transformer output;
  a flyback diode disposed at the transformer output; and
  a switching transistor disposed in series with the transformer input;
 a control circuit configured to operate the switching transistor such that the flyback transformer operates in discontinuous conduction mode (DCM), the control circuit further comprising:
  a clock configured to generate a clock signal faster than the frequency of the alternating current power source; and
  a safety control mechanism configured to monitor a voltage at the switching transistor; and
 an ignition exciter output stage having a tank capacitor and an igniter, wherein the transformer output is connected across the tank capacitor and operates to charge the tank capacitor, and wherein the igniter operably discharges the tank capacitor;
 wherein the control circuit operating the switching transistor achieves a power factor greater than 0.8; and
 wherein the control circuit is configured to operate the switching transistor by way of a SET and RESET latch cycle and the clock signal is received at a SET input of a latch, and wherein the safety control mechanism is connected with a RESET input of the latch.

12. The ignition system of claim 11 wherein the control circuit is further configured to operate the switching transistor such that the flyback transformer operates in DCM at a constant frequency.

13. The ignition system of claim 11 wherein the control circuit is further configured to operate the switching transistor such that the flyback transformer operates in DCM at a constant duty cycle.

14. The ignition system of claim 11 wherein the operating the switching transistor enables the receiving of current at the transformer input to correlate a current of the power supply.

15. The ignition system of claim 11 wherein the control circuit is configured to operate the switching transistor by way of ensuring the charging power stays constant in response to line voltage changes.

16. The high frequency switching converter of claim 1, further comprising a second clock configured to generate a second clock signal, and wherein the second clock signal and the safety control mechanism are connected with an OR gate, and wherein an output of the OR gate is connected with the RESET input of the latch.

17. The high frequency switching converter of claim 1 wherein the safety control mechanism is adapted to generate a signal following a discharge of the capacitor.

* * * * *